United States Patent [19]

Chapman, Jr. et al.

[11] Patent Number: 5,089,200
[45] Date of Patent: Feb. 18, 1992

[54] PROCESS FOR MELT EXTRUSION OF POLYMERS

[75] Inventors: George R. Chapman, Jr., Media, Pa.; Rita S. McMinn, Newark; Donnan E. Priester; William L. Phillips, both of Wilmington, all of Del.

[73] Assignee: E. I. DuPont de Nemours and Company, Wilmington, Del.

[21] Appl. No.: 584,336

[22] Filed: Sep. 20, 1990

Related U.S. Application Data

[63] Continuation-in-part of Ser. No. 417,947, Oct. 6, 1989, abandoned.

[51] Int. Cl.$^5$ ............................................. B29C 47/94
[52] U.S. Cl. .................................. 264/127; 264/130; 264/169; 264/176.1; 264/211; 264/300; 425/461; 425/467; 427/135
[58] Field of Search ...................... 264/126.1, 211, 169, 264/130, 127, 300; 425/461, 467, 94, 97; 427/135

[56] References Cited

U.S. PATENT DOCUMENTS

| | | | |
|---|---|---|---|
| 3,125,547 | 3/1964 | Blatz | 525/231 |
| 3,942,937 | 3/1976 | Prober et al. | 264/169 |
| 4,552,712 | 11/1985 | Ramamurthy | 425/467 |
| 4,554,120 | 11/1985 | Ramamurthy | 425/467 |
| 4,615,858 | 10/1986 | Su | 425/467 |
| 4,812,267 | 3/1989 | Hoffmann et al. | 264/169 |

FOREIGN PATENT DOCUMENTS

| | | | |
|---|---|---|---|
| 61-249735 | 11/1986 | Japan | 425/461 |
| 62-149412 | 7/1987 | Japan | 425/461 |
| 2030922A | 4/1980 | United Kingdom | 264/130 |

*Primary Examiner*—Jeffery Thurlow

[57] ABSTRACT

Process of melt extruding through an extrusion die whose surface is coated with one or more metal oxides, $M_xO_y$, wherein M is a metal selected from the group consisting of Ti, Zr, Cr, Fe, Ni, Pd, Pt, Cu, Ag, Au, Al and Si, and x and y are selected to satisfy the valencies of M, a difficultly-melt-processable polymer containing 0.002-2 parts by weight, based on the weight of the polymer, of at least one melt-processible fluorocarbon polymer processing aid having a fluorine to carbon ratio of at least 1:2 and having metal oxide-reactive sites capable of reacting with or physically associating with the metal oxide of the die surface.

53 Claims, 1 Drawing Sheet

PROCESS FOR MELT EXTRUSION OF POLYMERS

CROSS-REFERENCE TO RELATED APPLICATION

This is a continuation-in-part of application Ser. No. 07/417,947 filed Oct. 6, 1989 and expressly abandoned Oct. 5, 1990.

BACKGROUND OF THE INVENTION

1. Field of the Invention

This invention relates to an improved process for the melt extrusion of difficulty-melt-processible polymers.

2. Background

In melt extrusion of polymer resins there are often flow regimes, determined by the rheological properties of the particular resin, where anomalous flow behavior occurs leading to surface imperfections on the extrudate surfaces. Such imperfections, commonly called melt fracture, appear in different forms. The so-called "sharkskin" fracture occurs at lower shear rates and appears as a general, finely-structured and uniform roughness. It may be due to a slip in the die land area and exit region, although there is still controversy over the exact cause (see Kalika and Denn in Journal of Rheology, Vol 31, pp 815-834, (1987)). In a blown-film extrusion, sharkskin fracture may appear as an undesirable herringbone pattern, reducing clarity and giving a dull surface. In practice this may occur at uneconomically low extrusion rates. At higher shear rates flow often becomes unstable and a non-uniform stick-slip melt fracture results, wherein alternating bands of glossy surface and sharkskin fracture appear. This behavior is especially undesirable in wire coating and in tube and pipe extrusions, as well as in blown film processes. Other recognized problems that create difficulties in extrusion include poor pumping that leads to fluctuations in pressure and results in uneven output, accumulation of degraded polymer and polymer additives at the die exit orifice, and the like.

In an effort to improve the extrusion behavior of polymer resins through metal dies it is known to coat the die surfaces that contact the flowing polymer melt with a slip agent, such as tetrafluoroethylene polymers and copolymers, as in Japanese Application Publication Kokai 55-82784 (Mitsui Petrochem. Ind., KK), but bonding to the metal is poor, and over a period of time in use the slip layer is depleted and melt fracture resumes.

In other practices, as for example in the extrusion of certain hydrocarbon polymers and copolymers, it is known to employ small amounts of fluorocarbon polymers, blended with the extrusion resin, as a continuously replenishing slip agent. Thus Blatz, in U.S. Pat. No. 3,125,547, discloses hydrocarbon polymer compositions having improved extrusion behavior that contain small amounts of fluorocarbon polymers that are above their glass transition temperature if amorphous or above their crystalline melting point, if crystalline (e.g. molten) at the process temperatures. Under these conditions the flow rate above which melt fracture occurs is increased, and required extrusion pressures for a given extrusion rate are diminished. Takeshi and Inui in Japanese Examined Application Kokoku 70-30574 disclose continuous extrusion molding of polyethylene compositions containing small amounts of tetrafluoroethylene polymer (crystalline at process temperatures). U.S. Pat. No. 4,904,735 discloses, as process aids, synergistic combinations of fluoropolymers that are molten at process temperatures, such as fluoroelastomers, and those that are not molten at process temperatures, such as crystalline tetrafluoroethylene homopolymers and copolymers.

In the practice of these teachings, wherein a fluoropolymer process aid is added to the extruding resin, the fluoropolymers contact metal surfaces of the extruder and die parts and preferentially collect there, thus providing a low surface energy slip layer between the extruding resin melt and the metal surfaces. However, it is a deficiency of these systems that the fluoropolymers are only weakly adhered to the polymer-contacting parts of the extruder die. As a result, when the extruding resin contains mineral fillers such as are commonly added to serve as antiblocking agents or pigments, the beneficial slip layer may be removed,;for example, by abrasion, as rapidly as it is deposited, and all or part of the beneficial effect of the fluoropolymer additive is lost.

It is an object of this invention to provide a process for the extrusion of difficultly-melt-processible resins containing fluoropolymer process aids through a die wherein at least the polymer-contacting exit region of the die has been specially treated so as to improve the adhesion of the fluoropolymer process aid to the metal surfaces, such that the effectiveness and efficiency of the process aids are improved and the detrimental effect of mineral fillers is greatly minimized.

SUMMARY OF THE INVENTION

The invention resides in a process comprising melt extruding through an extrusion die a composition comprising a difficulty-melt-processible polymer and 0.002 - 2% by weight, based on the weight of the polymer, of at least one melt-processible fluorocarbon polymer processing aid, said fluorocarbon polymer processing aid having a fluorine to carbon ratio of at least 1:2, preferably at least 1:1.5, wherein the die surface is coated with an effective amount, to improve processibility of the difficultly-melt-processible polymer, of one or more metal oxides, $M_xO_y$, wherein M is a metal selected from the group Ti, Zr, Cr, Fe, Ni, Pd, Pt, Cu, Ag, Au, Al and Si, and x and y are selected to satisfy the valencies of M, and wherein said fluorocarbon polymer has incorporated therein an effective amount of metal oxide-reactive sites capable of reacting with or physically associating with the metal oxide of the die surface.

In another embodiment, the invention is a polymer extrusion die wherein the polymer-contacting die surface contains metal oxides, $M_xO_y$, wherein M is a metal selected from the group Ti, Zr, Cr, Fe, Ni, Pd, Pt, Cu, Ag, Au, Al and Si, and x and y are selected to satisfy the valencies of M, and has bonded thereto a fluoropolymer process aid.

In yet another embodiment, the invention resides in a process for treating the surface of a die for the extrusion of polymers, the process comprising incorporating into the polymer-contacting die surface a metal oxide $M_xO_y$ wherein M is a metal selected from the group Ti, Zr, Cr, Fe, Ni, Pd, Pt, Cu, Ag, Au, Al and Si, and x and y are selected to satisfy the valencies of M, and subsequently bonding thereto a fluoropolymer process aid.

DETAILED DESCRIPTION OF THE INVENTION

Figure 1:
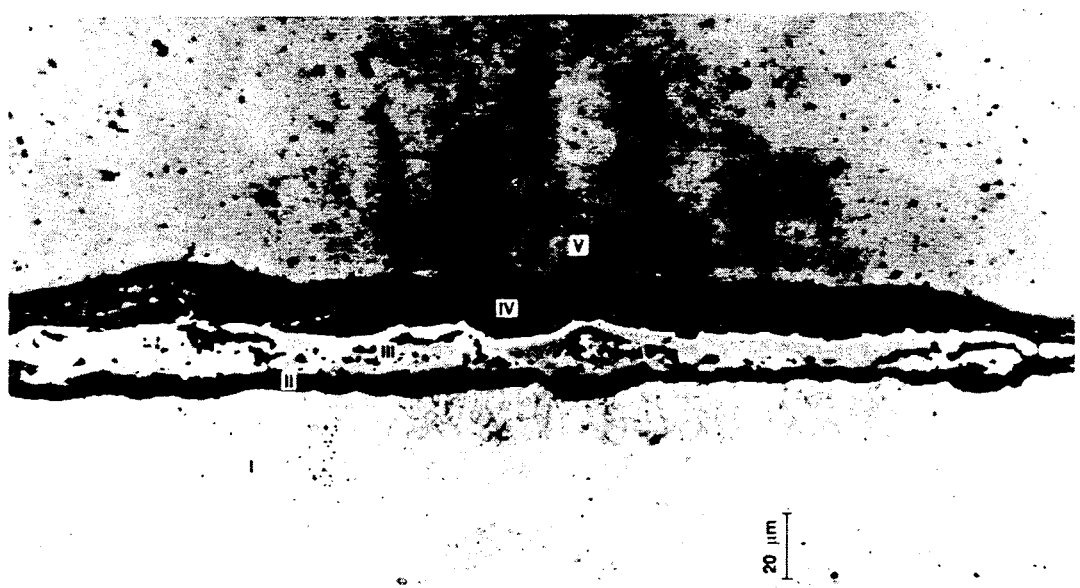
FIG. 1 depicts the metallurgical microstructure of a polymer-contacting die surface of the invention, described in more detail in the Examples below.

In accordance with the invention it has been discovered that the utility of fluoropolymer process aids for improvement of the extrusion behavior of difficultly-melt-processible polymers, especially those polymers containing polymer additives, for example, antiblock agents, such as a mineral or glass beads, is greatly improved when the die surface that contacts the flowing, molten polymer melt has associated therewith one or more metal oxides, in an amount greater than that present on die surfaces under ordinary conditions of use.

The term "extrusion behavior" is intended to include, individually or in combination, such parameters as the die pressure reached during extrusion, the operating melt temperatures required, and the maximum extrusion rates that can be achieved while maintaining melt stability and good extrudate surface quality. Additional examples of poor extrusion behavior include the formation of deposits of decomposed extruding polymer resin or its components around the die exit orifice, and/or uneven pumping of the polymer melt that causes fluctuations in pressure and output and a resulting surging of the polymer melt. Yet another measure of "extrusion behavior" resides in the efficiency of use of the fluoropolymer process aid, that is, in the amount that may be required to achieve noticeable and economically useful improvement in extrusion properties.

Difficultly-melt-processible polymers are defined as those that require uneconomically high extrusion pressures or temperatures for extrusion; extrude with unacceptable melt fracture, such that the surfaces of the extrudate are blemished under conditions that would be otherwise technically feasible or economically attractive; give excessive deposits of resin or decomposed resin components at the die exit orifice; and/or extrude under conditions such that large fluctuations in barrel or die pressure are experienced.

As examples of difficultly-melt-processible polymers that are operable in the compositions and processes of the invention, the following are cited: mono-olefin polymers; vinyl aromatic polymers, such as polystyrene; copolymers of alpha-olefins, particularly ethylene, with one or more monomers selected from vinyl esters, such as vinyl acetate and vinyl propionate, with (meth)acrylic esters, such as ethyl or methyl (meth)acrylate, with acrylonitrile and with (meth)acrylic acids and their (ionomeric) metal salts; chlorinated polyethylene; polyvinyl chloride; polyester; polyamide.

When the difficultly-melt-processible polymer is a hydrocarbon polymer, used, for example, in blown film extrusion, it generally will have a melt index (ASTM D-1238) at 190° C. of 5 or less, preferably 3 or less. For high shear melt processing, such as fiber extrusion or injection molding, even high melt index resins, for example, having a melt index of 20 or more, may suffer extrusion difficulties. Hydrocarbon polymers operable herein include elastomeric copolymers of ethylene and propylene and, optionally, a non-conjugated diene monomer, for example, 1,4-hexadiene, and, in general, any thermoplastic hydrocarbon polymer obtained by the homopolymerization or copolymerization of a monoolefin(s) of the formula $CH_2=CHR$, wherein R is H or an alkyl radical, usually of not more than eight carbon atoms. In particular, this invention is applicable to the following: polyethylene, both of the high density type and the low density type having densities within the range 0.89 to 0.97; polypropylene; polybutene-1; poly(3-methylbutene); poly(methylpentene); and linear low density copolymers of ethylene and an alpha-olefin, such as propylene, butene-1, hexene-1, octene-1, decene-1, octadecene and 4-methylpentene-1.

Difficultly-melt-processible polyesters are condensation polymers derived from dicarboxylic acids and dialcohols and/or from hydrocarboxylic acids or the corresponding lactones, such as polyethylene terephthalate, polybutylene terephthalate and poly-1,4-dimethylolcyclohexane terephthalate.

Difficultly-melt-processible polyamides and copolyamides are derived from diamines and dicarboxylic acids and/or amino acids or the corresponding lactams, such as polyamide 6, polyamide 6/6, polyamide 6/10, polyamide 11 and polyamide 12.

The invention is also applicable to blends and alloys of difficultly- melt-processible polymers, and particularly to difficultly-melt-processible polymers containing pigments and antiblock agents, such as silica, clays and glass microbeads. Light stabilizers and antioxidants may also be included. As used herein, the term "alloy" is intended to describe compositions obtained by melt compounding of polymeric components containing co-reactive functional groups. As an example of such an alloy is an alloy comprised of a polyamide 6/6, an ethylene/n-butyl acrylate/methacrylic acid copolymer and an ethylene/n-butyl acrylate/glycidyl methacrylate copolymer.

Because of the different extrusion characteristics of the polymers operable herein, the utility of the invention may be of greater value with some polymers than with others. For example, hydrocarbon polymers, such as polypropylene and branched polyethylene, that are not of high molecular weight, have good melt flow characteristics even at low temperatures, so that surface roughness and other surface defects can be avoided by adjustment of extrusion conditions. Extrusion of such hydrocarbon polymers may only require the use of this invention under adverse extrusion conditions. However, other polymers, such as high molecular weight, high density polyethylene or linear low density polyethylene copolymers, and high molecular weight polypropylene and propylene copolymers with other olefins, particularly those with narrow molecular weight distributions, do not have this degree of freedom in the variation of extrusion conditions and it is particularly with these resins that remarkable reductions in extrusion pressure and/or improvements in the surface quality of the extruded product are obtained by means of the invention.

The fluoropolymer process aids that may be used in the invention may be classified as those that are melt-processible fluoroelastomers or fluororesins. It is not required that they be above their Tg or crystalline melting point at the processing temperature of the difficultly-melt-processible resin, but it is considered that they should be deformable under the shear stresses of the extrusion, so that a layer of the fluoropolymer may be caused to form at the metal oxide surface of the extrusion die (described in more detail below).

It has been discovered that it is essential that the fluoropolymer process aid have an effective amount of polar functionality to bond the process aid to the metal oxide die surface through either chemical or physical interactions. Especially effective polar groups are sulfonic or carboxylic groups of the type disclosed hereinbelow, and may be situated on the polymer chain ends as a result of the polymerization procedure or by a post-polymerization treatment step, or may be randomly located along the polymer chain as part of a polar-group-containing copolymerized monomer. Suitable polar groups may also include active hydrogen atoms capable of hydrogen bonding.

It has further been discovered that copolymers of tetrafluoroethylene and hexafluoropropylene having high concentrations of polar end groups are excellent process aids for difficulty-melt-processable resins. These polymers are prepared in aqueous polymerization systems using inorganic peroxide initiators that leave —COOH or —COF end groups. In contrast, as exemplified below, when the said polar end groups are removed by a humid heat treatment (as is commonly done in commercial practice to improve the thermal stability of these polymers) as disclosed in U.S. Pat. No. 3,085,083, or by a fluorination reaction, as disclosed in U.S. Pat. No. 4,742,122, these compositions no longer function as effective process aids.

Accordingly, in one embodiment, the fluoropolymer process aids of the invention are defined as those that have a molecular weight of at least 10,000, have a fluorine to carbon ratio of at least 1:2, preferably at least 1:1.5, are capable of forming a coating at the metal oxide die surface, and contain functional polymer chain end groups —W, wherein W is selected from —COF, —OSO$_3$M, —SO$_3$M, —OH and —COOM, wherein M is hydrogen, a metal cation, preferably an alkali or alkaline earth metal cation, or a quaternary ammonium cation. The concentration of the functional group, W, should be at least about 100 groups per million carbon atoms (pmc), preferably at least about 200 groups pmc. It may be advantageous to use more than one process aid in the process of the invention.

Another class of fluoropolymer process aid having utility in the process of the invention includes polyvinylidene fluoride and copolymers thereof with other fluoromonomers, especially hexafluoropropylene. Such polymers contain hydrogen atoms in —CH$_2$— groups that are situated between electron-withdrawing perfluorinated carbon atoms, and these hydrogens are believed to be capable of hydrogen bonding to the metal oxide surface.

Another class of fluoropolymers having practical utility include homopolymers and copolymers of tetrafluoroethylene, having polar end groups comprising —COOH and —COF groups that are introduced as a consequence of the preparative method, and are exemplified by the following: perfluoroelastomers comprised of tetrafluoroethylene and a perfluoro(alkyl vinyl ether), preferably perfluoro(methyl vinyl ether) and, optionally, a curesite monomer (as disclosed in U.S. Pat. Nos. 3,132,123 and 4,281,092); melt-processable, partially crystalline copolymers of tetrafluoroethylene and 2–20 mole % of at least one perfluoroolefin of 3 to 8 carbon atoms, preferably hexafluoropropylene (see U.S. Pat. No. 2,946,763) preferably prepared without a buffer present to ensure the presence of —COOH end groups; partially crystalline copolymers of tetrafluoroethylene and perfluoro(alkyl vinyl ether) prepared by an aqueous process (see U.S. Pat. No. 3,635,926) and having largely —COOH end groups, or by a non-aqueous process (see U.S. Pat. No. 3,642,743) and having largely —COF end groups (all of which are incorporated herein, by reference). The concentrations of —COF and —COOH groups in these perfluoropolymers can be estimated by the infrared method described hereinbelow.

Other fluoropolymers having utility as process aids in the invention include elastomeric or crystalline copolymers of vinylidene fluoride and one or more fluorine-containing comonomers exemplified by the following: copolymers of vinylidene fluoride and a monomer selected from hexafluoropropylene, chlorotrifluoroethylene, 1-hydropentafluoropropylene and 2-hydropentafluoropropylene; copolymers of vinylidene fluoride, tetrafluoroethylene and hexafluoropropylene or 1- or 2-hydropentafluoro-propylene; copolymers of vinylidene fluoride, hexafluoropropylene and perfluoro(alkyl vinyl ether). They are prepared in aqueous polymerization systems using inorganic initiator systems as described in U.S. Pat. Nos. 2,986,649 and 3,051,677 and have —OSO$_3$H, —SO$_3$H and —COOH end groups, typically 50–1000 combined end groups of this type per million chain carbon atoms (See Logothetis, Prog. Polymer, Sci., Vol. 14, pp 257, 258 [1989]). Elastomeric copolymers of tetrafluoroethylene and propylene, optionally with a small amount of vinylidene fluoride, also have utility herein.

In yet another exemplification, the fluoropolymer process aids useful in the process of the invention comprise homopolymers of tetrafluoro-ethylene or copolymers of tetrafluoroethylene and a perfluoromonomer selected from the group hexafluoropropylene and perfluoro(alkyl vinyl ether), that have been subjected to 2–80, preferably 15–80, megarads of ionizing radiation by methods such as are disclosed in U.S. Pat. No. 3,766,031. Such treatment generates —COF and —COOH groups, usually accompanied by at least some backbone scission and reduction in molecular weight.

In still another important aspect of the invention the fluoropolymer process aids are copolymers of tetrafluoroethylene and 0.5–40, preferably 4–40, mole % of a functional-group-containing monomer

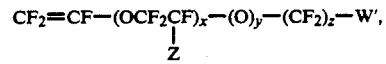

wherein Z is F or —CF$_3$, x is 0 or an integer of 1–4, y is 0 or 1, z is an integer of 1–12, and W' is —SO$_2$F, —SO$_2$Cl or —COOR, wherein R is a C$_{1-3}$ alkyl, such as are described in U.S. Pat. Nos. 3,282,875; 3,506,635; 3,718,627; 4,065,366; 4,138,426; 4,178,218; 4,487,668, 4,528,512; 4,329,434; and 4,508,603; or wherein W' is —SO$_3$M or —COOM and M is hydrogen, a metal cation, (preferably an alkali metal cation, most preferably sodium or potassium) or a quaternary ammonium cation, and is derivable from the above by acid or basic hydrolysis. In preferred compositions of this embodiment Z is —CF$_3$, x and y are 1, z is 1–5, preferably 2, and W' is —SO$_2$F, —CO$_2$CH$_3$, —SO$_3$M or —COOM.

It will be recognized by those skilled in the art that for those resins that extrude at high temperatures and, in addition, are chemically sensitive, for example polyesters and polyamides, it is important to select fluorocarbon process aids that are thermally stable at the process temperatures. Generally speaking, such polymers are those that are very nearly perfluorinated, such as copolymers of tetrafluoroethylene and other perfluoroolefins. Copolymers of vinylidene fluoride and hexafluoropropylene may dehydrohalogenate at temperatures in excess of about 250° C. and are of lesser utility under these conditions.

It is an important aspect of this invention that at least the polymer-contacting exit region or the die land region (the surface) of the extrusion die or nozzle be coated with an amount of a metal oxide greater than that present on the die surface under ordinary conditions of use. The requisite oxide layer can be readily observed by standard metallurgical techniques, including x-ray diffraction (XRD), electron spectroscopy for chemical analysis (ESCA) and electron diffraction spectroscopy (EDS). Dies and nozzles that are commonly used for blown film extrusions, pipe extrusions, profile extrusions and the like, or for blow molding or injection molding, have designs that are well known.

The metal oxides that are useful herein have the general formula $M_xO_y$ wherein M is a metal selected from the group Ti, Zr, Cr, Fe, Ni, Pd, Pt, Cu, Ag, Au, Al, and Si, and x and y are selected to satisfy the valencies of the metal. The metal may be in more than one oxidation state. The metal oxide coating may comprise a mixture of more than one metal oxide or two or more layers of different metal oxide coatings.

The metal oxide coating can be prepared by thermal oxidation process in an oxygen containing environment or by selected chemical processes.

When a thermal oxidation process is employed, the entire die body, or at least those parts constituting the die land area, are heated in an oxygen-containing atmosphere. This can be accomplished by heating in an open flame for 2 min. to 2 hrs., depending on the part size, or, more conveniently, by heating 0.2-10 hrs. at 300°-1000° C., preferably 0.5-5 hrs. at 300°-800° C. in a high temperature oven or muffle furnace in an air atmosphere. Induction heating processes can also be employed. The metal oxide, $M_xO_y$, may be derived from (1) the major component of the die part, for example $Fe_3O_4$ from a tool steel or carbon steel part, (2) a minor component of a die alloy, for example $Cr_2O_3$, along with iron oxides, from a ferritic or austenitic stainless steel part or (3) a surface coating of a metal or metal alloy deposited onto the surface of the die part, as for example a chrome-plated steel die part Said surface coatings are readily obtained by standard procedures known in the art.

The thickness of the metal oxide surface layers prepared by an oxidation process will be greater than the native oxide layers found after air exposure of the dry metal surfaces at ambient temperatures, and will be dependent on the relative oxidizability of the metal substrate and the conditions of heat treatment of the die part. For oxidation resistant metals such as pure chromium, the native oxide layer thicknesses appears to be 0.0015 micrometer or less (Storp and Holm in "Surface Science," Vol. 68, p. 10-19, 1977). More readily oxidized metals may have higher native oxide thicknesses. Relative oxidizability can be estimated by comparison of appropriate constants that have been derived for use with the Arrhenius equation for metal oxidation, as detailed by O. Kubaschewski and B. E. Hopkins in "Oxidation of Metals and Alloys", p. 162, Academic Press, N.Y., N.Y. (1953). For iron oxide surfaces, oxide layer thickness will vary from 1-50 micrometers, preferably from 10-40 micrometers. Intermediate oxide layer thicknesses of 0.1-0.5 micrometer are obtained when thermally oxidizing ferritic stainless steel, and are desired to be as thick as possible. On the other hand, chromium oxide layers prepared by oxidation are often too thin to be measured by standard metallurgical techniques, and are thought to be in the range of 0.005-0.1 micrometer, well above the native oxide layer thicknesses of 0.0015 or less micrometer found on pure chromium.

Chemical procedures that are useful for the preparation of metal oxide coated die surfaces can be selected from the following: chemical vapor deposition (CVD) and plasma vapor deposition (PVD) wherein the ionized metal is reacted with a partial vapor pressure of oxygen under vacuum conditions and deposited as the oxide on the metal die part substrate (in PVD the substrate is heated to a higher temperature than in CVD; see "CVD, A Bibliography", IFI/Plenum, New York, N.Y. 1981); plasma or thermal spraying, wherein a metal oxide powder is softened in a plasma gun and air sprayed onto the substrate (see "Plasma Spray Handbook," Naval Station, Louisville, Kentucky, 1977); flame spraying, wherein a metal oxide powder is heated in a gaseous flame and air sprayed onto the die part substrate (see "Flame Spray Handbook", Vol. I-II-III, Metco Inc., Westbury, N.Y); conversion coating, wherein a compound such as chromic acid is painted, sprayed or dip-coated on the substrate to be coated, and then reacted, usually in air, to form an oxide coating such as $Cr_2O_3$ (Kaman, in U.S. Pat. Nos. 4,077,808 and 3,734,767); gas diffusion coating, wherein a substrate is coated by a pack cementation process which involves surrounding the part to be coated with a reactive compound, heating the compound and part to be coated to an elevated temperature and allowing the gases from the compound to form a coating (H. Schafer, "Chemical Transport Reactions", Academic Press, N.Y, 1964); ion bombardment, wherein the material to be applied is vaporized and ion-implanted in the substrate at high velocity (Engel, in U.S. Pat. No. 3,915,757); anodization, wherein the surface of the part, usually aluminum, is converted to an oxide while the part is an anode in an electrolytic cell (U.S. Pat. No. 3,706,603); passivation, wherein the oxide coating is altered by chemical means (Phillips, in U.S. Pat. No. 4,518,440) to increase $Cr_2O_3$ concentration.

The metal oxide coating prepared by chemical processes will also vary in thickness according to the metal and method of formation, but will be in excess of the native oxide layers to be found after the exposure of the dry metal surface to air at ambient temperatures. Similarly, the metal oxide coating will have a degree of roughness that will vary according to the method of deposition, and can be modified by appropriate polishing techniques.

For best practice of any embodiment of the invention, the metal oxide surface should have a root mean square roughness, RMS (ASM B46.1-1962), of 5-1000, preferably 10-100.

It is an important feature of this invention that an effective amount of the fluoropolymer process aid becomes adhered to the metal oxide surface of the die. Preferably, it should cover at least 30% of the polymer-contacting die surface. The amount of coverage can be readily determined by examination of the die surface by scanning electron microscopy (SEM); x-ray diffraction analysis (EDX); and by electron spectroscopy for chemical analysis (ESCA), or by examination of the die/polymer interface by standard metallurgical procedures following the extrusion. The amount of coverage can be correlated with the presence of metal oxide.

It will be recognized by those skilled in the art that maximum improvement in one extrusion behavior parameter may be obtained at the expense of corresponding improvements in other parameters. For example, increased output of extrudate with high quality surface characteristics may not necessarily be accompanied by reduced die pressure. Similarly, in some systems substantial reductions in operating die pressures are achieved, but without significant improvements in extrudate surface qualities. Alternatively, and for matters of operating economies, it may be desirable to operate at very low levels of fluoropolymer process aid rather than to achieve the maximum improvements in extrusion parameters achievable at higher concentrations. The best set of conditions will be determined by the specific requirements of the extrusion.

The addition of the fluorocarbon polymer process aid to the difficultly-melt-processible polymer can be accomplished by any of the means heretofore developed for the addition of modifiers to such polymers. The fluorocarbon polymer can be added, for example, to a hydrocarbon polymer on a rubber compounding mill or in a Banbury or other internal mixer or in a mixing extruder. When the fluoropolymer process aid is a nonmassing powder, it is also feasible to dry-blend the fluoropolymer process aid with the host polymer in the solid state, and then effect uniform distribution of the fluoropolymer in the melt extruder employed in the fabrication by using an extruder screw with good mixing capability.

Alternatively, in some cases, masterbatch dispersions of the fluoropolymer process aid in a diluent polymer can be metered to the feed section of the extruder by appropriate devices or dry-blended with the host polymer prior to extrusion. Exceptions to this practice may apply where fluoropolymer process aids that are not necessarily melted at extrusion process temperatures are heated to higher temperatures in the masterbatch-forming process, under which conditions fluoropolymer particles may coalesce to larger particles which are not appropriately subdivided in the final extrusion of the difficultly-melt-processible polymer. The diluent polymer can be a difficultly-melt-processible polymer, or it can be a melt-processible polymer that does not substantially deleteriously affect the interaction of the aforesaid fluoropolymer process aid with the metal oxide surfaces of the extrusion die. For example, when the difficultly-melt-processible polymer is LLDPE the diluent polymer can be a melt-processible hydrocarbon polymer, such as a homopolymer or copolymer of a monoolefin(s) of the formula $RCH=CH_2$ wherein R is H or an alkyl radical, usually of not more than eight carbon atoms.

In the practice of this invention, it will be found that the beneficial effects in the reduction of extruder die pressures and improvement in the rates of extrusion that may be employed without encountering melt fracture are not necessarily observed immediately on the onset of extrusion, and depending on the overall concentrations of modifier, it may take from 10 minutes to 8 hours to reach stable extrusion rate and die pressure. Longer times are required at low concentrations of fluoropolymer process aid. When it is desirable to hasten the achievement of equilibrium, it may be expedient to first "condition" the extruder rapidly using a composition containing 0.5-2 parts of the fluorocarbon polymer process aid and then to switch to the desired reduced concentration of process aid.

In a particularly valuable embodiment, it has been found that by the process of this invention, extrusion behavior of difficultly-melt-processible polymer resin compositions containing fluoropolymer process aids can be improved even in the presence of inorganic fillers or antiblocking agents. Such additives are not necessarily limited to, but may include silica, clays and glass microbeads, calcium carbonate, titanium dioxide and other pigments. It has been found that, when anadherent layer of fluorocarbon process aid has been formed on the metal oxide die surfaces, it is not abraded away by such additives in the polymer mixas readily as is the case in the absence of the requisite metal oxide surface. The amount of additive is not necessarily limited, but is preferably the minimum amount needed to accomplish the desired purpose of the process, and may be in the range of 0.1-2 parts by weight, preferably 0.1-0.5 part by weight, based on the weiqht of the difficultly-melt-processiblepolymer.

The concentration of the polar functional groups in perfluoropolymer process aids of the invention can be determined from the infrared spectrum of compression-molded films, according to the technique described in U.S. Pat. No. 4,742,122, as follows:

The quantitative measurement of the number of end groups is obtained using the absorptivities measured on model compounds containing the end groups of interest The end groups of concern, the wavelengths involved, and the calibration factors determined from model compounds are shown below:

| End Group | Wavelength, Micrometers | Calibration Factor (CF) |
|---|---|---|
| —COF | 5.31 | 406 |
| —CO$_2$H (M) | 5.52 | 335 |
| —CO$_2$H (D) | 5.64 | 320 |
| —CO$_2$CH$_3$ | 5.57 | 368 |
| —CONH$_2$ | 2.91 | 914 |
| —CF=CF$_2$ | 5.57 | 635 |
| —CH$_2$OH | 2.57 | 2220 |

(M) = Monomeric
(D) = Dimeric

The calibration factor is a mathematical conversion to give end group values in terms of ends per $10^6$ carbon atoms. The concentration of each type of end in a polymer film may generally be obtained from this equation:

$$\frac{\text{End Groups per}}{10^6 \text{ Carbon Atoms}} = \frac{\text{absorbance} \times \text{CF}}{\text{film thickness}}$$

where film thickness is in millimeters.

Some of the absorbance peaks may interfere with one another when —CO$_2$H(D), —CO$_2$H(M), and —CF=CF$_2$ ends are all present. Corrections have been developed for the absorbances of —CO$_2$H(D) (hydrogen-bonded carboxylic acid dimer) and the —CF=CF$_2$ ends. These are as follows (where $\mu$ is wavelength in micrometers):

$$\frac{\text{absorbance at } 5.46\mu - (0.3 \times \text{absorbance } 5.58\mu)}{0.91} = \text{corrected absorbance for —CO}_2\text{H(D)}$$

$$\frac{\text{absorbance at } 5.57\mu - (0.3 \times \text{absorbance } 5.58\mu)}{0.91} = \text{corrected absorbance for —CF=CF}_2$$

The presence of —CONH$_2$ or —CO$_2$CH$_3$ may also interfere with the acid and —CF=CF$_2$ absorbances. Since these groups are generally the result of additives to polymerization, their presence is generally predictable. A suspicion of —CONH$_2$ absorbance in the vicinity of 5.6 micrometers can be checked by searching for the auxiliary -CONH2 band at 2.91 micrometers.

The polymer films (0.25 to 0.30 mm thick) are scanned on a Perkin-Elmer 283B spectrophotometer with a film of the same thickness and known to contain none of the ends under analysis, in the instrument reference beam. The instrument is set up with a Response Time setting of 1, a Scan Time setting of 12 minutes, Ordinate Expansion of 2, a Slit Program of 7, and an Auto-Check Gain control of 20%. The films are then scanned through the pertinent regions of the spectrum making sure that adequate base lines are established on each side of the pertinent absorbances.

The polymer films are generally compression molded at 270°–350° C. The presence of certain salts, particularly alkali metal salts, may cause end group degradation within this temperature range. If these salts are present, the films should be molded at the lowest possible temperature.

Note that this method is calibrated for use with perfluoropolymers. If the carbon to which the functional group is attached contains hydrogens, there will be some shifts in absorption wavelengths and calibration factors, thus introducing some uncertainties in the estimation.

In the examples that follow the facility of the fluoropolymer process aid in forming a strongly bonded slip layer on the metal-oxide-coated die surface is evaluated by its ability to retain improved extrusion behavior when a particulate antiblocking agent, such as silica, is added to the blend of difficultly-melt-processible resin and process aid. The degree of reduction in extrusion pressure that is maintained after addition of an abrasive antiblocking agent, in effect, provides a good diagnostic test for the presence of a strongly bonded fluoropolymer layer at the metal oxide interface.

EXAMPLES

The evaluations reported below employed a C.W. Brabender Instruments, Inc. Computerized Plasti-Corder equipped with a 19.1 mm. (¾ in.) diameter extruder with a 25/1 length/diameter ratio. The screw had ten feed flights, 10 compression flights with a compression ratio of 3:1, and 5 metering flights. Operating parameters were controlled by four independent heating zones, four pressure transducers and a torque-measuring drive unit with 1–120 rpm capability. The instrument was equipped with software for rheometric extrusion testing. Except where noted, the extrusion head used for these tests was a horizontal ribbon (tape) die body made of #416 ferritic stainless steel, supplied by C.W. Brabender, and was designed to accept die inserts of variable composition, such that the exit width was 2.54 cm (1.0 in.), the land length was 1.016 cm. (0.4 in.) and the die gap was a nominal 0.508 mm. (0.02 in.). The various new die inserts were either used as received after wiping with clean cheesecloth to remove surface contaminants or were specially treated as described in the examples.

In operation, the required machine conditions were set and the polymer resin then extruded, usually at 60 rpm, until equilibrium (constant throughput and constant die pressure) was reached. For a linear low density polyethylene with a melt index at 190° C. of 1, extrusion at 60 rpm gave a throughput of about 25–28 g./min. and a die pressure of about 19–30 Mpa (2800–4300 psi), depending on the exact die gap. Experiments were carried out in a sequence of unmodified resin, followed by resin containing fluoropolymer process aid, and finally, resin containing fluoropolymer process aid and antiblock agent. When changing the feed composition, the initial output parameters corresponded to the previous equilibrium, and then gradually changed to a new equilibrium. In most of the examples that follow, when switching from unmodified hydrocarbon polymer to the blend containing fluoropolymer process aid, a "conditioning" operation using a 1% blend of fluoropolymer process aid was first used for 30 min. to speed the attainment of equilibrium, and then the feed was switched to a blend containing the desired test concentration of fluoropolymer process aid. When equilibrium was achieved for each composition a range of screw speeds were then run to produce new equilibrium values of throughput and die pressure. Surface quality of the extrudate was judged by visual examination.

After each series of examples the die inserts were removed, and the die body and extruder were purged with one of several materials, such as PCX-12 (available from Du Pont of Canada), Du Pont 3535 polyethylene (from the Du Pont Company), 1 melt index LLDPE, or LLDPE containing 10% silica. Replacement die inserts were installed. After calibration of the transducers, the unmodified resin was run first to establish equilibrium conditions, and to assure that reliable output was being obtained. If previously established equilibrium values for unmodified resin were not achieved, the cleanout procedure was repeated. Because it has been found that combinations of small amounts of fluoroelastomer and fluororesins can act synergistically, especially on unmodified dies, the extruder was cleaned extremely well following any use of fluoroelastomer or polyvinylidene fluoride, using the following procedure. The extruder and die body were purged as above and were then completely disassembled. The screw, barrel, die assembly, transducers and thermocouples were thoroughly cleaned, first with a motor driven brass brush, and finally with acetone solvent. An extrusion test for equilibrium parameter values was then carried out as described above.

The materials used in the following examples are as follows End group functionality, where reported, was not necessarily determined on the exact samples employed in the examples, but is believed to be generally representative of the class of material described.

LLDPE

A high molecular weight, linear low density (d=0.918) copolymer of ethylene and butene-1 having a melt index (ASTM D-1238, cond. E) of 1.0.

EPDM

A commercially available copolymer of 71 wt. % ethylene, 25 wt. % propylene and 4 wt. % of diene monomer, having a Mooney viscosity, ML-4, approximately 60 at 121° C.

Fluoroelastomer 1

A commercially available fluoroelastomer nominally containing polymer repeat units of 60 wt. % vinylidene fluoride and 40 wt. % hexafluoropropylene and having a Mooney viscosity of 60 at 100° C. Typical end group acidity of these polymers is in the range of 1–15 mmoles/kg of polymer, indicating the presence of both "strong" (—CH$_2$OSO$_3$H, —SO$_3$H, —CF$_2$COOH) and "weak" (—CH₂COOH) acid groups It was employed as a 2 wt. % concentrate in polyethylene.

Fluoroelastomer 2

A commercially available copolymer composed of polymer repeat units of vinylidene fluoride, hexafluoropropylene and tetrafluoroethylene (45, 30, and 25 wt. %, respectively) having a Mooney viscosity, ML-4, of 70 at 100° C. Typical end group acidity of these polymers is in the range of 1-15 mmoles/kg of polymer. It was used as a 2 wt. % concentrate in polyethylene.

Fluoroelastomer 3

A commercially available copolymer of tetrafluoroethylene, propylene and a small amount of vinylidene fluoride. End group acidity was not measured. It was used as a 2% blend in polyethylene.

TFE homopolymer A

A commercially available dispersion-process-polymerized, fibrillatible, non-melt-processible TFE fine powder containing a small amount of copolymerized hexafluoropropylene, used as a 2% masterbatch dispersed powder in polyethylene. End group functionality is low because of the high molecular weight.

TFE homopolymer B

A commercially available, high molecular weight, non-melt-processible granular PTFE, prepared by suspension polymerization, having a standard specific gravity of 2.16 and ground to an average particle size of 35 micrometers, used as a 2% masterbatch in polyethylene. End group functionality is low because of the high molecular weight.

TFE homopolymer C

A free-flowing PTFE power comprising loose agglomerates of submicron-sized particles, having fibrillating characteristics, that has been treated with ionizing radiation as described in U.S. Pat. No. 3,766,031, has a DSC melting point in the range 330°-335° C. and contains 300-500 —COF and —COOH end groups per million carbon atoms.

FEP copolymer

A copolymer of tetrafluoroethylene and 12 wt. % of hexafluoropropylene and having a molecular weight of approximately 90,000 and a DSC melting point maximum at 250-280° C. It was isolated in a powder form without humid heat treatment. By analysis it contained approximately 370 carboxyl endgroups per million carbon atoms and had essentially no —COF end groups.

TFE/E polymer

A commercially available powdered, essentially alternating copolymer of tetrafluoroethylene, ethylene and a small amount of proprietary termonomer, and had a DSC melting maximum in the range of 250° C. Although strong acid or acid fluoride end groups have not been measured, it is expected that their concentration is very low because of the high hydrocarbon concentration and the method of polymerization of the polymer.

TFE/PPVE copolymer

A commercially available powdered copolymer of tetrafluoroethylene and 3-4 wt. % of perfluoro(propyl vinyl ether) and having a DSC melting maximum in the range of 300°-315° C. Typical end group acid and acid fluoride functionality is 100-200 units per million carbon atoms.

PVdF

A commercially available copolymer of vinylidene fluoride and hexafluoropropylene having a reported melting point of 140°-145° C., used as a 2% masterbatch in polyethylene.

Silica

Superfloss ® silica, used as a 20% masterbatch in 9 melt index low density polyethylene Talc Vertal ® 15, used as a 10% masterbatch in LLDPE.

Glass beads

Zeospheres ® glass beads used as a 10% masterbatch in LLDPE

COMPARATIVE EXAMPLE I (A) The extruder, equipped with a tape die utilizing previously unused tool steel inserts, was fed unmodified LLDPE with the screw operating at 60 rpm and heating zones controlling at nominal temperature settings of 150°, 180°, 200° and 204° C., respectively. Equilibrium extrusion conditions, where throughput and die pressure were constant, were reached after a period of 20 min. The screw speed was then systematically varied from 30 rpm to 120 rpm. After determining the extrusion rate at various screw speeds, the data were input to a computer program that generated a curve of die pressure vs. throughput from which selected data, tabulated as shown in Table 1, were computed. The surface appearance of the film strip extrusion was evaluated visually. Melt fracture occurred at all extrusion rates in excess of 13.3 g./min. For purposes of comparison, "melt fracture" is defined as a herringbone-like roughness on the surface of the extrudates.

(B) Without changing extruder conditions, the extruder feed was changed to a "conditioning" blend of LLDPE containing intimately mixed therein 1 part by weight of FEP polymer process aid. After 30 min. the feed was switched to a blend of LLDPE containing 0.1000 part by weight (1000 ppm) of FEP polymer. The die pressure continued to decrease gradually, and after a total time of 220 min. following the switch to fluoropolymer blend a new equilibrium was established. Extrusion was continued without any further die pressure changes, and after a total extrusion time of 575 min., and in a procedure similar to that described in (A), the die pressures were determined at the same extrusion rates given in (A). For each extrusion rate, a percent decrease in die pressure for (B), relative to (A) was calculated, and the average pressure drop for all 5 recorded extrusion rates was calculated as 61.8%. Data are shown in Table 1. Melt fracture occurred at extrusion rates in excess of 42.8 g./min.

(C) Without changing extruder conditions, the extruder feed was changed to a blend of LLDPE containing intimately mixed therein 1000 ppm of FEP polymer process aid and 5000 ppm of silica antiblocking agent. The die pressure gradually increased, and a new equilibrium was established within 83 min. In a procedure similar to that described in (A) the die pressures were determined at the same extrusion rates given in (A). For each extrusion rate, a percent decrease in die pressure for (C), relative to (A) was calculated, and the average pressure drop for all 5 recorded extrusion rates was calculated as 4.8%. Data are shown in Table 1. Melt fracture occurred at extrusion rates in excess of 13.2 g./min.

EXAMPLE 1-3

For Example 1 a pair of tool steel die inserts were scrubbed with a ScotchBrite ® scouring pad (3M Co.) and heated in air in a furnace for 2 hrs at 475° C. These cleaning and heating steps were repeated for a second time. After cooling, the die surfaces were wiped lightly with cheesecloth to remove loose scale, and were then installed in the die body, taking care to avoid contamination. A series of extrusions similar to those described in Comparative Example 1, parts (A), (B) and (C) was then carried out. For part (A) a 1% "conditioning" blend was used for 30 min., and after switching to a blend of 1000 ppm of FEP polymer a new equilibrium was established after a further 195 min. Extrusion was continued until the total conditioning time was 350 min. Then the average pressure drops for parts (B) and (C), relative to those in (A) were calculated as in Comparative Example 1, and are recorded in Table 1. Similarly, for Examples 2 and 3, tool steel die inserts were twice cleaned and heated at 650° C. and 800° C., respectively, in air atmosphere. Extrusion procedures were the same as for Example 1, and similarly obtained data are given in Table 1. A "conditioning" step with a 1% blend of Fluoropolymer B was used with Example 3, but not with Example 2. The times required for each new equilibrium to be established and extrusion rates, g/min , above which melt fracture occurred for Examples 1-3 are also shown in Table 1.

METALLURGICAL STUDIES

Following a procedure similar to that of Example 1(C) the die was cooled and carefully disassembled so that the die assembly remained intact and the die-insert//melt//die-insert geometry was maintained. The hydrocarbon layer was carefully peeled away from one of the inserts, leaving about 30 area percent of the surface covered by a fluorocarbon polymer film. The coated die insert was potted in epoxy and cross-sectioned in a direction parallel to the melt flow direction and perpendicular to the long dimension of the die inserts. The exposed surface was metallurgically polished and examined by EDS and x-ray diffraction analysis. At each die insert interface five distinct regions were identified, as is shown in the optical micrograph of FIG. 1, as follows: Region I—tool steel die insert main body; Region II—silica, migrated from within the die body; Region III—iron oxide, $Fe_3O_4$; IV—FEP process aid; V—epoxy mounting medium. Thus a firmly bonded fluoropolymer/metal oxide interface is identified. The iron oxide layer had a thickness of 5-20 micrometers.

By contrast, when the die inserts had not been heat treated, as in Comparative Example 1, and were examined, as above, after part (C) there was very little fluoropolymer process aid bonded to the die surface.

EXAMPLE 4

Tool steel die inserts that had been twice cleaned and heated in an air atmosphere in a furnace for 2 hrs at 650° C., as in Example 2, were tested in a series of extrusions similar to those described in Comparative Example 1, except that in series (B) the feed stock was a blend of LLDPE containing 100 ppm of dispersed FEP polymer and in series (C) the feed was a blend containing 100 ppm of FEP polymer and 5000 ppm of silica. Extrusion data are shown below and are compared with similar data for a control experiment in which the die inserts were not heated prior to extrusion.

|  | Example 4 | Control |
|---|---|---|
| Average pressure drop, %: | | |
| (B) relative to (A) | 57 | 41 |
| (C) relative to (A) | 28 | 6 |
| Extrusion rate where melt fracture begins: | | |

|  | Example 4 | Control |
|---|---|---|
| (A) | 13.6 | 11.3 |
| (B) | 15.2 | 13.1 |
| (C) | 14.0 | 11.4 |

COMPARATIVE EXAMPLE 2

In a procedure like that of Comparative Example 1, extrusion of (A) unmodified LLDPE, (B) LLDPE containing intimately blended therein 1000 ppm of FEP polymer , and (C) LLDPE containing intimately blended therein 1000 ppm of FEP polymer and 5000 ppm of silica antiblocking agent was carried out using new, untreated ferritic stainless steel (#416) inserts that were grit-blasted and wiped clean before use. Melt fracture and die pressure drops for (B) and (C) relative to (A) are given in Table 2.

EXAMPLES 5-8

These experiments were carried out using new ferritic stainless steel (#416) inserts that had been heat treated in an air atmosphere for 2 hrs. at 300° C., 475° C., 650° C., and 800° C., respectively, for Examples 5, 6, 7 and 8. After cooling, the die surfaces were lightly wiped with cheesecloth and were then installed in the tape extrusion die, taking care to avoid contamination. In procedures like that of Comparative Example 1, extrusion of (A) unmodified LLDPE, (B) LLDPE containing intimately blended therein 1000 ppm of FEP polymer, and (C) LLDPE containing intimately blended therein 1000 ppm of FEP polymer and 5000 ppm of silica antiblocking agent were carried out Melt fracture and die pressure drops for (B) and (C) relative to (A) are given in Table 2.

Analyses by metallurgical cross-sectioning of stainless steel die inserts that had been heat treated under the same conditions as in Example 6 showed that there were two oxide layers. The outermost layer was almost 100% $Fe_3O_4$, whereas the innermost layer was approximately 50 mole % ferric oxides and 50 mole % chromium oxides. The thickness of the oxide layers was 2.5-3.5 micrometers.

EXAMPLE 9

In this experiment the extruder was equipped with nitrided #416 capillary dies having a diameter of 2 mm and a length of 40 mm. In experiments 9a, 9b and 9c new capillaries were heated briefly, with a propane torch, to temperatures of 96°, 508°, and 715° C., respectively, as determined by thermocouples inserted within the capillary. For Example 9d a new capillary was heated in a furnace for 2 hrs at 650° C. The extrusion characteristics of these dies were evaluated under conditions (A), (B), and (C), as described in Comparative Example 1, except that TFE homopolymer C was used in place of FEP polymer Data are shown in Table 3. Following the extrusion the dies were removed and metallurgically cross sectioned The oxide coatings were characterized as shown in the table. Where there was only one layer, it was composed of $Fe_3O_4$. Where there were two layers, the outer was $Fe_3O_4$, and the inner layer was a mixture of $Fe_3O_4$ and $Cr_2O_4$.

EXAMPLE 10

Parts (A) and (B) of this example were run as in Example 7, except that for 10A, procedure (C), 5000 ppm talc was used in place of silica, and in 10B, procedure (C), 6000 ppm of glass beads was used in place of silica. The extruder evaluation of these dies was carried out as in Example 7, and for each part a control experiment was run, in which the die inserts were not heated prior to use. The pressure drops for procedures (B) and (C), relative to (A) are shown below, as are the extrusion rates, g/min, above which melt fracture occurred for conditions (B) and (C).

| Example | control | Ex. 10A | control | Ex. 10B |
|---|---|---|---|---|
| Pressure drop, (B), % | 49 | 47 | 52 | 45 |
| Pressure drop, (C), % | 2 | 19 | 1 | 24 |
| Melt fract. rate (B) | 37 | 15 | 38 | 15 |
| Melt fract. rate (C) | 16 | 14 | 16 | 14 |

COMPARATIVE EXAMPLE 3

Polished stainless steel die inserts that had been heat treated as described in Example 6 (2 hrs. at 475° C.) were submerged in a molten salt bath composed of sodium and potassium salts for 2 hrs. at 425° C. Analysis of the surface showed that the $Fe_3O_4$ coating had been entirely removed. The extrusion behavior of this die was evaluated as in Example 6, showing that the pressure reduction of condition (B) relative to condition (A) was 50%, and the pressure reduction of condition (C) relative to condition (A) was 3%. Thus, when the oxide layer is removed, the advantages of the invention are not retained.

COMPARATIVE EXAMPLE 4

In a procedure like that of Comparative Example 1, extrusion of (A) unmodified LLDPE, (B) LLDPE containing intimately blended therein 1000 ppm of FEP polymer, and (C) LLDPE containing intimately blended therein 1000 ppm of FEP polymer and 5000 ppm of silica antiblocking agent was carried out using new inserts that had been electroplated with chromium to a thickness of 25-50 microns. Melt fracture and die pressure drops for (B) and (C) relative to (A) are given in Tables 4 and 7.

EXAMPLE 11-13

These experiments were carried out using inserts that had been electroplated with chromium to a thickness of 25-50 um and were then scrubbed with a ScotchBrite pad and heated in a furnace for 2 hrs at 475° C., 650° C. and 800° C., respectively, for Examples 11, 12 and 13. These cleaning and heating steps were repeated for a second time. After cooling and wiping lightly with cheesecloth the inserts were then installed in the tape extrusion die, taking care to avoid contamination. In procedures like that of Comparative Example 1, extrusion of (A) unmodified LLDPE, (B) LLDPE containing intimately blended therein 1000 ppm of FEP polymer, and (C) LLDPE containing intimately blended therein 1000 ppm of FEP polymer and 5000 ppm of silica antiblocking agent were carried out. Melt fracture and die pressure drops for (B) and (C) relative to (A) are given in Table 4.

EXAMPLE 14

In this example a stainless steel extrusion head was equipped with chromium plated stainless steel die inserts with trapezoid shaped contact surfaces (8.8mm × 11.1mm × 15.9mm × 11.1mm). In Example 14a the inserts were heated 2 hrs. at 300° C., in Example 14b the inserts were heated by a propane torch until they reached a red glow, and in Example 14c the inserts were heated 2 hrs. at 650° C. A set of control dies were unheated. Each die insert was then examined by ESCA and the atom % oxygen, present as chromium oxide, and the atom % chromium were determined following conventional corrections for oxygen-containing chemiadsorbed material. From these values a ratio of metal oxide oxygen to chromium on the die surface was calculated for each die insert. A value of 1.5 for this ratio would thereby signify 100% conversion to $Cr_2O_3$.

Using the procedures described in Comparative Example 1, extrusion with these die inserts was then evaluated and the die pressure drops for conditions (B) and (C) relative to condition (A) were determined. Following the extrusion under condition (C) the die inserts were carefully removed and the polyolefin layer gently peeled away from the die surface. Analysis of this surface by SEM/EDX for fluoropolymer then gave an approximate measure of the surface that remained coated with an adhered coating of FEP polymer process aid. Data are summarized in Table 5 and show that only the heat treated die surfaces have a significant adhered layer of fluoropolymer process aid.

COMPARATIVE EXAMPLE 5

A portion (50 g) of the FEP polymer powder used in the above evaluations was placed in a chamber which was evacuated, purged with nitrogen, and then heated to 95° C. The chamber was again evacuated and pressured back up with nitrogen, evacuated again and then pressured back up with a 25/75 volume mixture of fluorine/nitrogen gases. The temperature was allowed to rise to 100° C. and the same gas mixture was passed through the reactor at 0.9 L/min. for 2 hrs. The temperature was raised to 185° C. while maintaining the same gas flow. After 1 hr. at 185° C. the gas flow rate was decreased to 0.7 L/min. The fluorine/nitrogen flow was maintained at this level until 4 hrs. after the temperature was raised to 185° C. The total amount of fluorine passed through the reactor was calculated from the cylinder pressure change to be 0.8 grams per gram of polymer. The chamber was then purged with nitrogen, cooled to room temperature, and opened to obtain the treated polymer. The treated polymer was cold pressed into a film which was scanned by Infrared Spectroscopy. Using known IR absorptivities for —COF and —COOH structures in fluoropolymers, it was determined that the treated polymer contained 14 —COF end groups per million carbon atoms and no —COOH end groups. This material was evaluated as follows:

(a) In a procedure like that of Comparative Example 1, extrusion of (A) unmodified LLDPE and (B) LLDPE containing intimately blended therein 1000 ppm of the above modified FEP polymer having no carboxyl end groups, was carried out using chromium plated inserts that had been heated for 2 hrs. at 600° C. in an oxidizing atmosphere. There was no drop in die pressure relative to (A) when the modified FEP was introduced in Condition (B), and there was no improvement in melt fracture behavior.

(b) In a procedure like that of Comparative Example 1, extrusion of (A) unmodified LLDPE and (B) LLDPE containing intimately blended therein 1000 ppm of FEP polymer was carried out using chromium plated die inserts that had been heated for 2 hrs. at 600° C. At 60 rpm there was a 42% drop in die pressure and a 10% increase in extrusion rate for (B), relative to (A). Then LLDPE containing 1000 ppm of the modified FEP was introduced. In 63 min the die pressure increased to the same level as in (A) and the extrusion rate fell to the same level as in (A).

COMPARATIVE EXAMPLE 6

Chrome-plated die inserts free of surface cracks (obtained from International Processing Company of America, Elk Grove Village, Illinois), after wiping lightly with cheesecloth were evaluated by extrusion procedures outlined in Comparative Example 1. Data are shown in Table 6.

EXAMPLE 15-17

Die inserts such as those described in Comparative Example 6 were cleaned and heat treated at 475° C. as described in Example 11. Using the procedures of Comparative Example 1 the extrusion behavior of compositions having the process aids shown in Table 6 was evaluated with the results shown in the table.

Chrome-plated die inserts of the type used in these examples were examined by ESCA before and after being heated 2 hrs. at 475° C. The die that had been heat treated was greatly enriched in chromium oxides, relative the die insert which was unheated.

EXAMPLE 18-20

Die inserts such as those described in Comparative Example 6 were cleaned and heat treated for 2 hrs. at 475°, 900° and 1100° C., respectively, for Examples 18, 19 and 20, as described in Example 11. RMS roughness (ASM B.46.1-1962) was measured using a Federal 2000 surface analyzer. The extrusion behavior of these die inserts was evaluated using the procedures of Comparative Example 1. Melt fracture and die pressure reduction data are given in Table 6, and show that excessive heat treatment leads to high surface roughness and diminished effectiveness of the fluoropolymer process aid.

EXAMPLE 21

Tape die inserts were provided with a chromium oxide coating by a plasma spray deposition process (prepared by Industrial Coating Co., Bridgeport, New Jersey). The oxide layer was approximately 0.13 mm (0.5 mil) thick and had an average particle size of approximately 75 micrometers, corresponding to an RMS roughness of 189. In procedures like that of Comparative Example 1, extrusion of (A) unmodified LLDPE, (B) LLDPE containing intimately blended therein 1000 ppm of FEP polymer, and (C) LLDPE containing intimately blended therein 1000 ppm of FEP polymer and 5000 ppm of silica antiblocking agent were carried out. Extrusion data are summarized in Table 7.

EXAMPLE 22

Tape die inserts prepared in the manner described for Example 21 with an original chromium oxide thickness of 0.2 mm were metallurgically polished to a final chromium oxide coating thickness of 0.12 mm and RMS roughness of 46. Extrusion evaluation was carried out as in Example 21, and data are given in Table 7.

EXAMPLE 23

Tape die inserts prepared as described in Example 22 were heated in an air atmosphere at 650° C. for 2 hrs. and polished to an RMS roughness of 26. The extrusion characteristics evaluated as in Example 22 and data are shown in Table 7.

EXAMPLE 24

Tape die inserts coated with a 1.5 micrometers thick layer of chromium oxide were prepared by chemical vapor deposition and after wiping lightly with cheese cloth, the extrusion characteristics were determined as described in Comparative Example 1. Data are shown in Table 7.

EXAMPLE 25

Tape die inserts prepared as in Example 24 were heated for 2 hrs at 475° C. in an air atmosphere and after wiping lightly with cheese cloth, the extrusion characteristics were determined as described in Comparative Example 1. Data are shown in Table 7.

EXAMPLE 26

Tape die inserts that had been prepared by a proprietary process described in U.S. Pat. No. 3,734,767 involving (1) painting steel die inserts with chromic acid, (2) baking at about 540° C. for 2 hrs., and (3) repetition of steps 1 and 2 10-12 times, were coated at Kaman Corporation, Colorado Springs, Colorado., and had a surface comprised of submicron-sized particles of approximately 50 mole % $Fe_3O_4$ and 50 mole % $Cr_2O_3$ as shown by SEM and EDX. Extrusion characteristics were evaluated as in Comparative Example 1, and data are shown in Table 8.

EXAMPLES 27

Tape die inserts, prepared as described in Example 26, were heated for 2 hrs. at 475° C. in an air atmosphere, and the extrusion characteristics evaluated as in Comparative Example 1. Data are shown in Table 8.

EXAMPLE 28

Tape die inserts that had been prepared by a proprietary process described in U.S. Pat. No. 4,077,808 involving (1) deposition of a submicron coating of silica and aluminum oxide powder onto steel die inserts using a volatile solvent vehicle, (2) painting with chromic acid, (3) baking at about 540° C. for 2 hrs., and (4) repetition of steps 2 and 3 10-12 times, were coated at Kaman Corporation, Colorado Springs, Colorado., and had a surface comprised of submicron-sized particles of approximately 40 mole % alumina, 10 mole % silica and 50 mole % chromium oxide, as shown by energy-dispersive X-ray analysis (EDX) The die inserts were further treated by heating for 2 hrs. at 475° C. in an air oven. Extrusion characteristics were evaluated as in Comparative Example 1, and data are shown in Table 8.

EXAMPLE 29

Stainless steel tape die inserts were treated by a "chromizing" process (by Alloy Surfaces Co., Wilmington, Delaware) in which the inserts were imbedded in a chromium-rich powder, and then heated to 1100° C. in a proprietary gas which transports chromium vapor to the parts to be treated. Metallurgical examination of a cross section showed a multilayer coating in which the interior layer is an alloy of 25% chromium and 75% iron, and the outer layer is an alloy of approximately 90% chromium and 10% iron oxides. The surface had a roughness of 58 RMS. Extrusion characteristics were evaluated as in Comparative Example 1 and data are shown in Table 8.

EXAMPLE 30

Tape die inserts prepared as in Example 29 were further treated by heating 2 hrs. at 475° C. in an air atmosphere, and extrusion characteristics of these inserts were evaluated as described in Comparative Example 1. Data are shown in Table 8.

EXAMPLES 31-36

For Examples 31-36, respectively, tool steel die inserts were plated with nickel, copper, titanium, gold, silver and platinum by chemical vapor deposition in high vacuum. Each pair of these inserts was subsequently heated for 2 hrs. at 475° C. in an air atmosphere and, after wiping lightly with cheesecloth, their extrusion characteristics evaluated as described in Comparative Example 1. Data are given in Table 9. As control experiments, similarly prepared nickel, copper, titanium and gold die inserts that were not heat treated were evaluated in the same way and data are also shown in Table 9.

EXAMPLE 37

Steel tool die inserts were coated with zirconium dioxide by chemical vapor deposition, heated 2 hrs. at 475° C. in an air oven, wiped lightly with cheesecloth and the extrusion characteristics evaluated as described in Comparative Example 1. Data are shown in Table 10.

EXAMPLE 38

Steel tool die inserts were coated with silicon dioxide by chemical vapor deposition, heated in an air oven for 2 hrs. at 475° C., wiped lightly with cheesecloth and extrusion characteristics evaluated as described in Comparative Example 1. Data are shown in Table 10.

EXAMPLE 39

Steel tool steel die inserts were coated with a mixture of approximately 50 mole % aluminum trioxide and 50 mole % titanium dioxide by a plasma spray coating process, polished to an RMS roughness of 60, wiped with cheesecloth and extrusion characteristics evaluated as described in Comparative Example 1. Data are shown in Table 10.

EXAMPLE 40

Tool steel die inserts were coated with aluminum oxide by a plasma spray coating process, polished to a RMS roughness of 58 and wiped clean with cheesecloth. Extrusion characteristics were evaluated as described in Comparative Example 1. Data are shown in Table 10.

EXAMPLE 41

Tool steel die inserts were coated with aluminum oxide by a plasma spray coating process. They were then lightly polished to a roughness of 58 RMS, heated for 2 hrs. at 475° C. in an air oven and wiped clean with cheesecloth. Extrusion characteristics were evaluated as described in Comparative Example 1. Data are shown in Table 10.

EXAMPLE 42

Tool steel die inserts were coated with titanium dioxide by a plasma spray coating process, polished to a RMS surface roughness of 63, wiped lightly with cheesecloth and extrusion characteristics evaluated as described in Comparative Example 1. Data are shown in Table 10.

COMPARATIVE EXAMPLE 7

This example was carried out using tool steel die inserts that were heated 4 hrs. at 650° C., in air. Extrusion characteristics were evaluated as in Comparative Example 1, except that 1000 ppm TFE homopolymer A, a non-melt-processable, fibrillatible PTFE with low endgroup functionality, was used in parts (B) and (C). There was no significant reduction in die pressure for either part (B) or (C), relative to the die pressures in part (A), as shown in Table 11.

COMPARATIVE EXAMPLE 8

This example was carried out using tool steel die inserts that were heated 4 hrs. at 650° C., in air. Extrusion characteristics were evaluated as in Comparative Example 1, except that 1000 ppm of TFE/E copolymer, was used in parts (B) and (C). There was no significant reduction in die pressure for either part (B) or (C), relative to the die pressure in part (A), as shown in Table 11.

EXAMPLES 43-46

These examples were carried out according to the procedures outlined in Comparative Example 1, using tool steel die inserts that had been heated as shown in Table 11, but also differed in that the fluoropolymer resins employed in parts (B) and (C) were those shown in the table. Extrusion data are given in the table and in each case are compared with data from a control experiment in which the die inserts were not heated prior to the extrusion test.

EXAMPLES 47-50

These examples were carried out according to the procedures outlined in Comparative Example 1, using tool steel die inserts that had been heated at 650° C., but differed in that fluoroelastomer process aids were employed in parts (B) and (C), as shown in Table 12. This table also shows data demonstrating the extrusion characteristics of these blend systems. For each example a control experiment was run in which the die inserts were not heated prior to the extrusion test.

EXAMPLE 51

This example was carried out according to the procedure of Comparative example 1 using tool steel die inserts that had been heated 2 hrs at 650° C., but differed in that the difficultly melt-processable hydrocarbon resin was EPDM and the fluoropolymer process aid was TFE Homopolymer C. The die pressure drops for procedures (B) and (C) relative to (A) were 43% and 19%. In a control experiment, in which the tool steel die inserts were not heated prior to evaluation, the corresponding relative pressure drops were 45% and 8%.

TABLE 1

|  | Comparative Example 1 | Example 1 | Example 2 | Example 3 |
|---|---|---|---|---|
| Heat treatment (2 times) | | | | |
| Time (hrs.) | — | 4 | 4 | 4 |
| Temperature (°C.) | — | 475 | 650 | 800 |
| Extrusion Rate, g/min | | Die Pressure, MPa | | |
| (A) LLDPE | | | | |
| 15 | 23.0 | 23.2 | 22.8 | 21.7 |
| 20 | 25.2 | 25.4 | 25.0 | 23.9 |
| 30 | 29.0 | 29.3 | 28.8 | 27.9 |
| 40 | 31.1 | 31.5 | 31.3 | 30.3 |
| 50 | 31.8 | 32.7 | 32.7 | 31.7 |
| (B) LLDPE + 1000 ppm FEP copolymer | | | | |
| Time to equilibrium, min | 220 | 195 | 150 | 150 |
| Total conditioning time, min | 575 | 350 | 490 | 450 |
| 15 | 7.9 | — | 9.4 | 12.0 |
| 20 | 8.8 | 10.8 | 10.5 | 13.5 |
| 30 | 10.8 | 13.3 | 12.8 | 16.4 |
| 40 | 12.6 | 15.1 | 14.2 | 17.4 |
| 50 | 14.0 | 16.4 | 15.6 | 18.1 |
| Average pressure drop, % (relative to A) | 62 | 54 | 56 | 43 |
| (C) LLDPE + 1000 ppm FEP copolymer + 5000 ppm silica | | | | |
| 15 | 22.2 | 14.7 | 16.2 | 16.9 |
| 20 | 24.1 | 16.2 | 17.8 | 18.7 |
| 30 | 27.5 | 19.0 | 20.7 | 21.6 |
| 40 | 29.7 | 20.9 | 22.4 | 23.0 |
| 50 | 29.6 | 22.3 | 23.3 | 23.3 |
| Average Pressure drop, % (relative to A) | 5 | 35 | 29 | 23 |
| Extrusion rate, g/min., at whch melt fracture begins | | | | |
| A | 13.3 | 13.2 | 13.3 | 13.4 |
| B | 42.8 | 31.0 | 30.0 | 45.1 |
| C | 13.2 | 41.6 | 41.8 | 41.0 |

TABLE 2

|  | Comparative Example 2 | Example 5 | Example 6 | Example 7 | Example 8 |
|---|---|---|---|---|---|
| Heat treatment | | | | | |
| Time (hrs.) | — | 2 | 2 | 2 | 2 |
| Temperature (°C.) | — | 300 | 475 | 650 | 800 |
| Condition | | | | | |
| (A) Melt fracture rate* | 14.1 | 11.0 | 13.3 | 13.3 | 13.2 |
| (B) Melt fracture rate* | **61.7 | 13.4 | 31.1 | 31.4 | 31.6 |
| Die pressure drop (%) relative to (A) | 49 | 46 | 53 | 54 | 54 |
| (C) Melt fracture rate* | 14.2 | 11.3 | 27.8 | 28.0 | 41.6 |
| Die pressure drop (%) relative to (A) | 3 | 24 | 33 | 34 | 33 |

*Extrusion rate, g/min., at which melt fracture begins
**Maximum extrusion rate possible, no melt fracture

TABLE 3

|  | Example 9 | | | |
|---|---|---|---|---|
|  | (a) | (b) | (c) | (d) |
| Heat treatment | torch | torch | torch | oven |
| Time | 25 sec | 4 min | 4 min | 2 hrs |
| Temperature (°C.) | 96 | 508 | 715 | 650 |
| Number of oxide layers | 1 | 1 | 2 | 2 |
| Oxide layer thickness, micrometer | 0 | 1 | 3 | 4 |
| Condition | | | | |
| (A) Melt fracture rate* | 8.2 | 8.4 | 8.3 | 8.1 |
| (B) Melt fracture rate* | 8.1 | 9.0 | 9.2 | **58.7 |
| Die pressure drop (%) relative to (A) | 10 | 26 | 36 | 50 |
| (C) Melt fracture rate* | 8.2 | 8.3 | 8.4 | **56.4 |
| Die pressure drop (%) relative to (A) | 3 | 7 | 14 | 17 |

*Extrusion rate, g/min, at which melt fracture begins
**Maximum extrusion rate possible, no melt fracture

TABLE 4

|  | Comparative Example 4 | Example 11 | Example 12 | Example 13 |
|---|---|---|---|---|
| Heat treatment | | | | |
| Time (hrs.) | — | 4 | 4 | 4 |
| Temperature (°C.) | — | 475 | 650 | 800 |

TABLE 4-continued

|  |  | Comparative Example 4 | Example 11 | Example 12 | Example 13 |
|---|---|---|---|---|---|
| Condition |  |  |  |  |  |
| (A) | Melt fracture rate* | 11.4 | 11.7 | 11.7 | 13.2 |
| (B) | Melt fracture rate* | 12.7 | 12.9 | 11.5 | 30.6 |
|  | Die pressure drop (%) relative to (A) | 38 | 41 | 34 | 48 |
| (C) | Melt fracture rate* | 11.8 | 12.4 | 12.5 | 13.8 |
|  | Die pressure drop (%) relative to (A) | 5 | 27 | 32 | 32 |

TABLE 5

|  |  | Example 14 | | | |
|---|---|---|---|---|---|
| Die Heat Treatment |  | Control None | (a) 2 hrs. 300° C. | (b) with torch | (c) 2 hrs. 650° C. |
|  |  |  | Die heat treatment | | |
| Ratio (Metal oxide oxygen)/chromium |  | 0 | 0.7 | 1.0 | 0.8 |
| Area % fluoropolymer after extrusion |  | 18 | 62 | 70 | 85 |
| Condition |  |  |  |  |  |
| (B) | % Die pressure drop relative to (A) | 43 | 41 | 45 | 43 |
| (C) | % Die pressure drop relative to (A) | 8 | 15 | 19 | 18 |

TABLE 6

|  |  | Comparative Example 6 | Example 15 | Example 16 | Example 17 | Example 18 | Example 19 | Example 20 |
|---|---|---|---|---|---|---|---|---|
| Heat Treatment |  |  |  |  |  |  |  |  |
| Time (hrs.) |  | — | 4 | 4 | 2 | 2 | 2 | 2 |
| Temperature (°C.) |  | — | 475 | 475 | 475 | 475 | 900 | 1100 |
| Extrusion aids (Parts B and D) |  |  |  |  |  |  |  |  |
| Fluoroelastomer 1, ppm |  | — | 1000 | 500 | 200 | — | — | — |
| FEP polymer |  | 1000 | — | 500 | 800 | 1000 | 1000 | 1000 |
| Surface roughness, RMS |  | — | — | — | — | 48 | 80 | 116 |
| Condition |  |  |  |  |  |  |  |  |
| (A) | Melt fracture rate* | 11.5 | 13.5 | 13.7 | 13.7 | 12.0 | 12.1 | 11.1 |
| (B) | Melt fracture rate* | 13.9 | **51.6 | **52.3 | **55.0 | 14.4 | 13.7 | 12.4 |
|  | Die pressure drop (%) relative to (A) | 46 | 39 | 41 | 44 | 52 | 37 | 20 |
| (C) | Melt fracture rate* | 11.5 | **55.2 | **55.4 | **55.5 | 12.6 | 13.0 | 11.8 |
|  | Die pressure drop (%) relative to (A) | 8 | 37 | 38 | 34 | 29 | 25 | 14 |

*Extrusion rate, g/min., at which melt fracture begins
**Maximum extrusion rate possible, no melt fracture

*Extrusion rate (g/min) at which melt fracture begins

TABLE 7

|  |  | Comparative Example 4 | Example 21 | Example 22 | Example 23 | Example 24 | Example 25 |
|---|---|---|---|---|---|---|---|
| Die insert surface Method of coating |  | Chromium electroplate | Cr$_2$O$_3$ plasma spray | Cr$_2$O$_3$ plasma spray | Cr$_2$O$_3$ plasma spray | Cr$_2$O$_3$ CVD | Cr$_2$O$_3$ CVD |
| RMS roughness |  | — | 189 | 46 | 26 | — | — |
| Heat treatment |  |  |  |  |  |  |  |
| Time (hrs.) |  | — | — | — | 2 | — | 2 |
| Temperature (°C.) |  | — | — | — | 650 | — | 475 |
| Condition |  |  |  |  |  |  |  |
| (A) | Melt fracture rate* | 11.4 | 13.3 | 13.4 | 13.1 | 12.7 | 12.1 |
| (B) | Melt fracture rate* | 12.7 | 15.0 | 14.9 | 14.7 | 15.1 | 14.1 |
|  | Die pressure drop (%) relative to (A) | 38 | 41 | 49 | 47 | 46 | 46 |
| (C) | Melt fracture rate* | 11.8 | 13.5 | 27.3 | 13.6 | 12.8 | 12.1 |
|  | Die pressure drop (%) relative to (A) | 5 | 19 | 25 | 28 | 12 | 16 |

*Extrusion rate, g/min., at which melt fracture begins
**Maximum extrusion rate possible, no melt fracture

TABLE 8

|  | Example 26 | Example 27 | Example 28 | Example 29 | Example 30 |
|---|---|---|---|---|---|
| Die insert surface | $Cr_2O_3$ $Fe_3O_4$ | $Cr_2O_3$ $Fe_3O_4$ | $Cr_2O_3$ $Al_2O_3$ | $Cr_2O_3$ $Fe_3O_4$ | $Cr_2O_3$ $Fe_3O_4$ |
| Heat treatment | | | | | |
| Time (hrs.) | — | 2 | 2 | — | 2 |
| Temperature (°C.) | — | 475 | 475 | — | 475 |
| Condition | | | | | |
| (A) Melt fracture rate* | 13.2 | 13.1 | 13.2 | 13.0 | 12.8 |
| (B) Melt fracture rate* | 30.4 | 45.6 | 59.8 | 44.0 | 14.8 |
|     Die pressure drop (%) relative to (A) | 58 | 55 | 52 | 48 | 47 |
| (C) Melt fracture rate* | 13.6 | 27.8 | **53.4 | 13.6 | 13.5 |
|     Die pressure drop (%) relative to (A) | 23 | 30 | 28 | 23 | 28 |

*Extrusion rate, g/min., at which melt fracture begins
**Maximum extrusion rate possible, no melt fracture

TABLE 9

|  | Example 31 | 32 | 33 | 34 | 35 | 36 | Control Examples Ni | Cu | Ti | Au |
|---|---|---|---|---|---|---|---|---|---|---|
| Die insert plating | Ni | Cu | Ti | Au | Ag | Pt | Ni | Cu | Ti | Au |
| Heat treating | | | | | | | | | | |
| Time (hrs) | 2 | 2 | 2 | 2 | 2 | 2 | — | — | — | — |
| Temperature (°C.) | 475 | 475 | 475 | 475 | 475 | 475 | — | — | — | — |
| Condition | | | | | | | | | | |
| (A) Melt fracture rate* | 11 | 12 | 12 | 12 | 11 | 13 | 12 | 12 | 12 | 12 |
| (B) Melt fracture rate* | 12 | 13 | 13 | 12 | 12 | 15 | 13 | 14 | 13 | 13 |
|     Die pressure drop (%) Relative to (A) | 29 | 21 | 34 | 30 | 20 | 54 | 45 | 41 | 44 | 39 |
| (C) Melt fracture rate* | 12 | 12 | 40 | 25 | 12 | 14 | 11 | 12 | 12 | 12 |
|     Die pressure drop (%) relative to (A) | 25 | 20 | 26 | 27 | 13 | 32 | 5 | 5 | 6 | 10 |

*Extrusion rate, g/min., at which melt fracture begins

TABLE 10

|  | Example 37 | Example 38 | Example 39 | Example 40 | Example 41 | Example 42 |
|---|---|---|---|---|---|---|
| Die Surface | $ZrO_2$ | $SiO_2$ | $Al_2O_3$ $TiO_2$ | $Al_2O_3$ | $Al_2O_3$ | $TiO_2$ |
| Heat treatment | | | | | | |
| Time (hrs) | 2 | 2 | — | — | 2 | — |
| Temperature (°C.) | 475 | 475 | — | — | 475 | — |
| Condition | | | | | | |
| (A) Melt fracture rate* | 13.0 | 11.9 | 11.3 | 11.3 | 11.2 | 12 |
| (B) Melt fracture rate* | 59 | 42 | 13.3 | 13.2 | 13.5 | 13.1 |
|     Die pressure drop (%) relative to (A) | 53 | 39 | 34 | 25 | 28 | 19 |
| (C) Melt fracture rate* | **54 | 12.0 | 11.9 | 11.2 | 11.8 | 11.9 |
|     Die pressure drop (%) relative to (A) | 32 | 12 | 17 | 8 | 17 | 11 |

*Extrusion rate, g/min., at which melt fracture begins
**Maximum extrusion rate possible, no melt fracture

TABLE 11

|  | Comp Ex. 7 | Comp Ex. 8 | Control | Ex. 43 | Control | Ex. 44 | Control | Ex. 45 | Control | Ex. 46 |
|---|---|---|---|---|---|---|---|---|---|---|
| Additive (ppm) | | | | | | | | | | |
| TFE homopolymer A | 1000 | — | — | — | — | — | — | — | — | — |
| TFE/E copolymer | — | 1000 | — | — | — | — | — | — | — | — |
| TFE homopolymer B | — | — | 1000 | 1000 | — | — | — | — | — | — |
| TFE homopolymer C | — | — | — | — | 1000 | 1000 | — | — | — | — |
| TFE/PPVE copolymer | — | — | — | — | — | — | 1000 | 1000 | — | — |
| PVdF | — | — | — | — | — | — | — | — | 50 | 50 |
| Heat treatment | | | | | | | | | | |
| Time (hrs) | 4 | 4 | — | 4 | — | 4 | — | 4 | — | 4 |
| Temperature (°C.) | 650 | 650 | — | 650 | — | 475 | — | 650 | — | 650 |
| Condition | | | | | | | | | | |
| (A) Melt fracture rate* | 11.8 | 13.0 | 11.4 | 13.8 | 13.2 | 13.1 | 11.6 | 11.3 | 11.8 | 11.2 |
| (B) Melt fracture rate* | 12.1 | 13.1 | 11.8 | 14.4 | 13.2 | 28.7 | 11.5 | 12.3 | 49.4 | 34.0 |
|     Die pressure drop | 4 | 3 | 10 | 23 | 0.4 | 41 | 0.2 | 20 | 25 | 35 |

TABLE 11-continued

|  |  | Comp Ex. 7 | Comp Ex. 8 | Control | Ex. 43 | Control | Ex. 44 | Control | Ex. 45 | Control | Ex. 46 |
|---|---|---|---|---|---|---|---|---|---|---|---|
|  | (%) relative to (A) |  |  |  |  |  |  |  |  |  |  |
| (C) | Melt fracture rate* | — | 12.9 | 11.4 | 13.8 | — | 13.8 | — | 11.3 | 11.6 | 11.8 |
|  | Die pressure drop (%) relative to (A) | — | 4 | 4 | 8 | — | 31 | — | 2 | 9 | 12 |

*Extrusion rate, g/min., at which melt fracture begins

TABLE 12

|  |  | Control | Ex. 47 | Control | Ex. 48 | Control | Ex. 49 | Control | Ex. 50 |
|---|---|---|---|---|---|---|---|---|---|
| Additive |  |  |  |  |  |  |  |  |  |
| Fluoroelastomer 1 |  | 25 | 25 | 1000 | 1000 | — | — | — | — |
| Fluoroelastomer 2 |  | — | — | — | — | 25 | 25 | — | — |
| Fluoroelastomer 3 |  | — | — | — | — | — | — | 25 | 25 |
| Heat treatment |  |  |  |  |  |  |  |  |  |
| Time (hrs) |  | — | 4 | — | 2 | — | 4 | — | 4 |
| Temperature (°C.) |  | — | 650 | — | 650 | — | 650 | — | 650 |
| Condition |  |  |  |  |  |  |  |  |  |
| (A) | Melt fracture rate* | 11.6 | 12.2 | 11.2 | 13.1 | 11.5 | 11.7 | 12.9 | 13.3 |
| (B) | Melt fracture rate* | 50.7** | 13.3 | 48.5 | 27.9 | 12.2 | 12.4 | 12.9 | 27.8 |
|  | Die pressure drop (%) relative to (A) | 20 | 31 | 31 | 37 | 16 | 20 | 7 | 14 |
| (B) | Melt fracture rate* | 11.5 | 12.2 | 40.4 | 54.1** | 11.6 | 11.7 | 12.9 | 13.4 |
|  | Die pressure drop (%) relative to (A) | 10 | 13 | 33 | 37 | 7 | 10 | 8 | 10 |

*Extrusion rate, g/min., at which melt fracture begins
**Maximum extrusion rate possible, no melt fracture

We claim:

1. A process comprising melt extruding through an extrusion die a composition comprising a difficultly-melt-processible polymer and 0.002-2% by weight, based on the weight of the difficultly-melt-processible polymer, of at least one melt-processible fluorocarbon polymer processing aid, said fluorocarbon polymer processing aid having a fluorine to carbon ratio of at least 1:2, wherein the die surface is coated with one or more metal oxides, $M_xO_y$, wherein M is a metal selected from the groups consisting of Ti, Zr, Cr, Fe, Ni, Pd, Pt, Cu, Ag, Au, Al and Si, and x and y are selected to satisfy the valencies of M, and wherein said fluorocarbon polymer processing aid has incorporated therein an effective amount of metal oxide-reactive sites capable of reacting with or physically associating with the metal oxide die surface.

2. The process of claim 1 wherein the fluorine to carbon ratio is at least 1:1.5.

3. The process of claim 1 wherein the composition further contains an inorganic filler.

4. The process of claim 3 wherein the inorganic filler is silica.

5. The process of claim 3 wherein the inorganic filler is talc.

6. The process of claim 3 wherein the inorganic filler is glass microbeads.

7. The process of claim 1 wherein the difficultly-melt-processible polymer is a mono-olefin polymer.

8. The process of claim 7 wherein the mono-olefin polymer is a homopolymer or copolymer of one or more monoolefins of the formula $RCH=CH_2$ wherein R is H or alkyl.

9. The process of claim 8 wherein R is $C_{1-8}$ alkyl.

10. The process of claim 8 wherein the polymer is low density polyethylene.

11. The process of claim 8 wherein the polymer is linear low density polyethylene.

12. The process of claim 8 wherein the polymer is high density polyethylene.

13. The process of claim 7 wherein the polymer is a copolymer of ethylene, propylene and a non-conjugated diene.

14. The process of claim 1 where the fluoropolymer process aid contains polar functionality present as polymer chain end groups selected from the group consisting of —COF, —SO$_3$M, —OSO$_3$M, —OH and COOM, wherein M is hydrogen, a metal cation or a quaternary ammonium cation.

15. The process of claim 1 wherein the fluoropolymer process aid contains polar functionality along the polymer chain that is present as carbon-hydrogen bonds capable of hydrogen bonding to the metal oxide surface of the die.

16. The process of claim 1 wherein the fluoropolymer process aid contains polar functionality attached along the polymer chain, selected from the group consisting of —SO$_2$F, —SO$_2$Cl, —SO$_3$M, —COOR and —COOM, wherein R is $C_{1-3}$ alkyl and M is hydrogen, a metal cation, or a quaternary ammonium cation.

17. The process of claim 1 wherein the fluoropolymer process aid is a fluoroelastomer.

18. The process of claim 17 wherein the fluoroelastomer is a copolymer of vinylidene fluoride and hexafluoropropylene.

19. The process of claim 17 wherein the fluoroelastomer is a copolymer of vinylidene fluoride, hexafluoropropylene and tetrafluoroethylene.

20. The process of claim 17 wherein the fluoroelastomer is a copolymer of tetrafluoroethylene and propylene.

21. The process of claim 17 wherein the fluoroelastomer is a copolymer of tetrafluoroethylene, propylene and vinylidene fluoride.

22. The process of claim 17 wherein the fluoroelastomer is a copolymer of tetrafluoroethylene and a perfluoro(alkyl vinyl ether).

23. The process of claim 17 wherein the fluoroelastomer is a copolymer of tetrafluoroethylene and perfluoro(methyl vinyl ether).

24. The process of claim 1 wherein the fluoropolymer process aid is a melt-processible fluororesin that has a glass transition temperature or crystalline melting temperature below 350° C.

25. The process of claim 24 wherein the fluororesin is a partially crystalline homopolymer or copolymer of vinylidene fluoride.

26. The process of claim 24 wherein the fluororesin is an irradiated polymer of tetrafluoroethylene.

27. The process of claim 24 wherein the fluororesin is a copolymer of tetrafluoroethylene and hexafluoropropylene.

28. The process of claim 24 wherein the fluororesin is a copolymer of tetrafluoroethylene and a perfluoro(alkyl vinyl ether).

29. The process of claim 28 wherein the fluororesin is a copolymer of tetrafluoroethylene and perfluoro(propyl vinyl ether).

30. The process of claim 28 wherein the fluororesin is a copolymer of tetrafluoroethylene and a perfluoro(alkyl vinyl ether), containing a functional group selected from the group consisting of —$SO_2F$, $SO_2Cl$, —COOR, —$SO_3M$ and —COOM where R is lower alkyl of 1-3 carbon atoms and M is hydrogen, an alkali metal cation or a quaternary ammonium cation.

31. The process of claim 1 wherein the metal oxide is $Fe_3O_4$.

32. The process of claim 1 wherein the metal oxide is $Cr_2O_3$.

33. The process of claim 1 wherein the metal oxide is a mixture of $Fe_3O_4$ and $Cr_2O_3$.

34. The process of claim 1 wherein the metal oxide is $Al_2O_3$.

35. The process of claim 1 wherein the metal oxide is a mixture of $Al_2O_3$ and $Cr_2O_3$.

36. The process of claim 1 wherein the metal oxide is $TiO_2$.

37. The process of claim 1 wherein the metal oxide is a mixture of $Al_2O_3$ and $TiO_2$.

38. The process of claim 1 wherein the metal oxide is $ZrO_2$.

39. The process of claim 1 wherein the metal oxide has a root mean square roughness of 5-1000.

40. The process of claim 39 wherein the metal oxide has a root mean square roughness of 10-100.

41. Polymer extrusion die wherein the polymer-contacting die surface contains metal oxide $M_xO_y$, wherein M is a metal selected from the group consisting of Ti, Zr, Cr, Fe, Ni, Pd, Pt, Cu, Ag, Au, Al and Si, and x and y are selected to satisfy the valencies of M, and wherein $M_xO_y$ has bonded thereto a fluoropolymer process aid.

42. The die of claim 41 wherein the fluoropolymer process aid is a fluoroelastomer.

43. The die of claim 41 wherein the fluoropolymer process aid is a melt-processible fluororesin that has a glass transition temperature or crystalline melting temperature below 350° C.

44. The die of claim 41 wherein the fluoropolymer process aid is bonded to the metal oxide by virtue of polar functionality present as polymer chain end groups selected from the group consisting of —COF, —$SO_3M$, —$OSO_3M$, —OH and —COOM, wherein M is hydrogen, a metal cation or a quaternary ammonium cation.

45. The die of claim 41 wherein the fluoropolymer process aid is bonded to the metal oxide by virtue of polar functionality attached along the polymer chain, selected from the group consisting of —$SO_2F$, —$SO_2Cl$, —COOR, —$SO_3M$ and —COOM, wherein R is $C_{1-3}$ alkyl and M is hydrogen, a metal cation or a quaternary ammonium cation.

46. The die of claim 41 wherein the metal oxide has a root mean square roughness of 5-1000.

47. The die of claim 46 wherein the metal oxide has a root mean square roughness of 10-100.

48. A process for treating a polymer extrusion die surface, said process comprising incorporating into the polymer-contacting die surface a metal oxide $M_xO_y$ wherein M is a metal selected from the group consisting of Ti, Zr, Cr, Fe, Ni, Pd, Pt, Cu, Ag, Au, Al and Si, and x and y are selected to satisfy the valence of M, and subsequently bonding thereto a fluoropolymer processing aid.

49. The process of claim 48, wherein the fluoropolymer process aid is a fluoroelastomer.

50. The process of claim 48, wherein the fluoropolymer process aid is a melt-processible fluororesin that has a glass transition temperature or crystalline melting temperature below 350° C.

51. The process of claim 48 wherein the fluoropolymer process aid is bonded to the metal oxide by virtue of polar functionality present as polymer chain end groups selected from the group consisting of —COF, —$SO_3M$, —$SO_3M$, —OH and —COOM, wherein M is hydrogen, a metal cation or a quaternary ammonium cation.

52. The process of claim 48 wherein the fluoropolymer process aid is bonded to the metal oxide by virtue of polar functionality attached along the polymer chain, selected from the group consisting of —$SO_2F$, —$SO_2Cl$, —$SO_3M$, —COOR and —COOM, wherein R is $C_{1-3}$ alkyl and M is hydrogen, a metal cation or a quaternary ammonium cation.

53. The process of claim 48 wherein said incorporation of metal oxide is achieved by heating the die.

* * * * *

UNITED STATES PATENT AND TRADEMARK OFFICE
CERTIFICATE OF CORRECTION

PATENT NO. : 5,089,200
DATED : Feb. 18, 1992
INVENTOR(S) : Chapman, Jr. et al.

It is certified that error appears in the above-identified patent and that said Letters Patent is hereby corrected as shown below:

Column 32:
Line 50 of Claim 51, replace "$-SO_3M$", second occurrence, with $-OSO_3M$.

Signed and Sealed this

Fourth Day of May, 1993

*Attest:*

MICHAEL K. KIRK

*Attesting Officer*     *Acting Commissioner of Patents and Trademarks*